(12) United States Patent
Houser et al.

(10) Patent No.: US 12,215,772 B2
(45) Date of Patent: Feb. 4, 2025

(54) MULTI-SPEED GEARBOX AND ASSEMBLY METHOD

(71) Applicant: Dana Heavy Vehicle Systems Group, LLC, Maumee, OH (US)

(72) Inventors: Jordan M. Houser, Sylvania, OH (US); William F. Waltz, Swanton, OH (US); Nicholas W. Smallman, Swanton, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 17/819,898

(22) Filed: Aug. 15, 2022

(65) Prior Publication Data
US 2024/0052922 A1 Feb. 15, 2024

(51) Int. Cl.
*F16H 57/023* (2012.01)
*F16D 11/04* (2006.01)
*F16D 11/10* (2006.01)
*F16D 11/14* (2006.01)
*F16H 48/08* (2006.01)
*F16H 48/24* (2006.01)
*F16H 48/42* (2012.01)
*F16H 57/00* (2012.01)
*F16H 57/02* (2012.01)

(52) U.S. Cl.
CPC .......... *F16H 57/023* (2013.01); *F16D 11/04* (2013.01); *F16D 11/10* (2013.01); *F16D 11/14* (2013.01); *F16H 48/08* (2013.01); *F16H 48/24* (2013.01); *F16H 48/42* (2013.01); *F16H 57/0025* (2013.01); *F16H 2048/087* (2013.01); *F16H 2048/423* (2013.01); *F16H 2057/02052* (2013.01)

(58) Field of Classification Search
CPC ............... F16H 3/38; F16H 2003/0815; F16H 2025/178; F16H 2061/0474; F16H 2063/3093; F16H 2200/2094; F16D 11/04; F16D 11/40; F16D 11/14
See application file for complete search history.

(56) References Cited

U.S. PATENT DOCUMENTS

| 3,788,157 A | * | 1/1974 | Carlson | F16H 63/32 192/48.91 |
| 4,098,380 A | * | 7/1978 | Thomas | F16D 21/04 192/48.91 |

(Continued)

FOREIGN PATENT DOCUMENTS

| CN | 102032342 A | * | 4/2011 | |
| CN | 112413064 A | * | 2/2021 | ........... F16D 23/025 |

(Continued)

*Primary Examiner* — Bobby Rushing, Jr.
(74) *Attorney, Agent, or Firm* — McCoy Russell LLP

(57) ABSTRACT

Methods and systems for a clutch cartridge are provided. The clutch cartridge includes, a dog clutch including a clutch ring slidingly engaged with a tube shaft and including a first toothed interface and a second toothed interface, where the dog clutch is designed to selectively engage a first gear and a second gear. The clutch cartridge further includes a first bearing coupled to the tube shaft and the first gear and a second bearing coupled to the tube shaft and the second gear.

19 Claims, 8 Drawing Sheets

(56) References Cited

U.S. PATENT DOCUMENTS

| | | | | |
|---|---|---|---|---|
| 6,371,268 | B1 * | 4/2002 | McMorris | F16D 11/04 |
| | | | | 192/69.41 |
| 7,428,854 | B2 * | 9/2008 | Moore | F16H 3/10 |
| | | | | 74/339 |
| 8,157,693 | B2 | 4/2012 | Waksmundzki | |
| 8,424,405 | B2 * | 4/2013 | Moore | F16H 3/10 |
| | | | | 192/48.92 |
| 11,047,463 | B2 | 6/2021 | Archer et al. | |
| 11,371,589 | B2 * | 6/2022 | Mock | B60K 17/02 |
| 2007/0269157 | A1 | 11/2007 | Fahrni et al. | |
| 2016/0290441 | A1 * | 10/2016 | Tsukada | F16H 63/38 |
| 2017/0368934 | A1 | 12/2017 | Edelen et al. | |
| 2021/0252973 | A1 * | 8/2021 | Engerman | B60K 17/046 |

FOREIGN PATENT DOCUMENTS

| | | | | | |
|---|---|---|---|---|---|
| CZ | 2017371 | A3 * | 8/2018 | | |
| EP | 4008921 | A1 * | 6/2022 | | F16D 11/10 |
| GB | 2461688 | A * | 1/2010 | | F16D 11/10 |
| KR | 20210085552 | A * | 7/2021 | | |

\* cited by examiner

MULTI-SPEED GEARBOX AND ASSEMBLY METHOD

TECHNICAL FIELD

The present disclosure relates to a multi-speed gearbox and an assembly method for a clutch cartridge and pinion shaft assembly.

BACKGROUND AND SUMMARY

Electric axles have been used in a variety of vehicle platforms to fulfill the electrification needs of different vehicle sectors. These electric axles include motors, geartrains, and differentials that form electric drive assemblies. When compared to electric drive units with motors, geartrains, and differentials spaced away from one another, certain electric axle configurations demand less alteration to adjacent vehicle systems, which allows the resources devoted to vehicle powertrain development to be decreased to a certain extent.

U.S. Pat. No. 9,062,744 B2 to Valente et al. shows an electric drive system with an electric motor, a two-speed transmission, and a differential. The two-speed transmission includes a friction clutch designed to change the gear ratio of a planetary gear set.

The inventors have recognized several issues with Valente's electric drive system as well as other prior electric axles. For instance, Valente's electric drive system may pose difficulties with regard to manufacturing and assembly. For example, due to the complex layout of the clutch pack and the gear assembly, the assembly process may be lengthy and involved. Other prior electric drive systems have exhibited manufacturing difficulties with regard to assembly and preloading of bearings on a pinion shaft which rotationally attaches to a ring of the differential.

The inventors have recognized the aforementioned challenges and developed a clutch cartridge to at least partially overcome the challenges. The clutch cartridge includes a dog clutch with a clutch ring. The clutch ring is slidingly engaged with a tube shaft and includes a first toothed interface and a second toothed interface. The dog clutch is designed to selectively engage the first toothed interface with a first gear toothed interface on a first gear. The dog clutch is further designed to selectively engage the second toothed interface with a second gear toothed interface on a second gear. The clutch cartridge further includes a first bearing coupled to the tube shaft and the first gear and a second bearing coupled to the tube shaft and the second gear. Designing the cartridge assembly in this manner, allows the clutch cartridge to be efficiently assembled on a bench or other suitable location. This clutch cartridge assembly may be carried out separately from the assembly process for an electric axle or other system in which the clutch cartridge is incorporated. In other words, the electric axle can be assembled in separate steps, if wanted. Consequently, the assembly and manufacturing efficiency and adaptability of the electric axle or other system may be increased, if so desired. Additionally, the manufacture of the parts in the cartridge may be simpler, allowing for less scrap or quality control part rejections since the features that are more complex to manufacture are distributed among multiple distinct parts, if desired.

In one example, the tube shaft includes an interior splined section and an interior locational fit section each designed to couple to a pinion shaft. Designing the tube shaft in this manner allows the clutch cartridge to be efficiently and reliably coupled to a pinion shaft. In this way, the efficiency of the system's or electric axle's assembly procedure is further increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A clutch cartridge which allows for efficient assembly and enables a system in which it is incorporated to be built in separate stages, if wanted. Consequently, the manufacturing efficiency of the system can be increased, if desired. Further, the construction of the physical parts of the clutch cartridge may be simplified, allowing for less scrap and quality control part rejections since the features that are more complex to manufacture can be distributed among multiple distinct parts, if wanted. To achieve the abovementioned manufacturing efficiency gains, the clutch cartridge includes a clutch ring of a dog clutch that is splined or otherwise slidingly engaged with a tube shaft. The clutch ring is designed to engage a first gear and a second gear which are mounted on the tube shaft via bearings. In this way, the clutch ring is capable of shifting between multiple gears at different time intervals. The tube shaft may include an interior spline and a locational fit section (e.g., locational clearance fit) which allow the shaft to be efficiently and effectively installed on a pinion shaft in machinery or a propulsion system such as an electric axle assembly.

Figure 1:
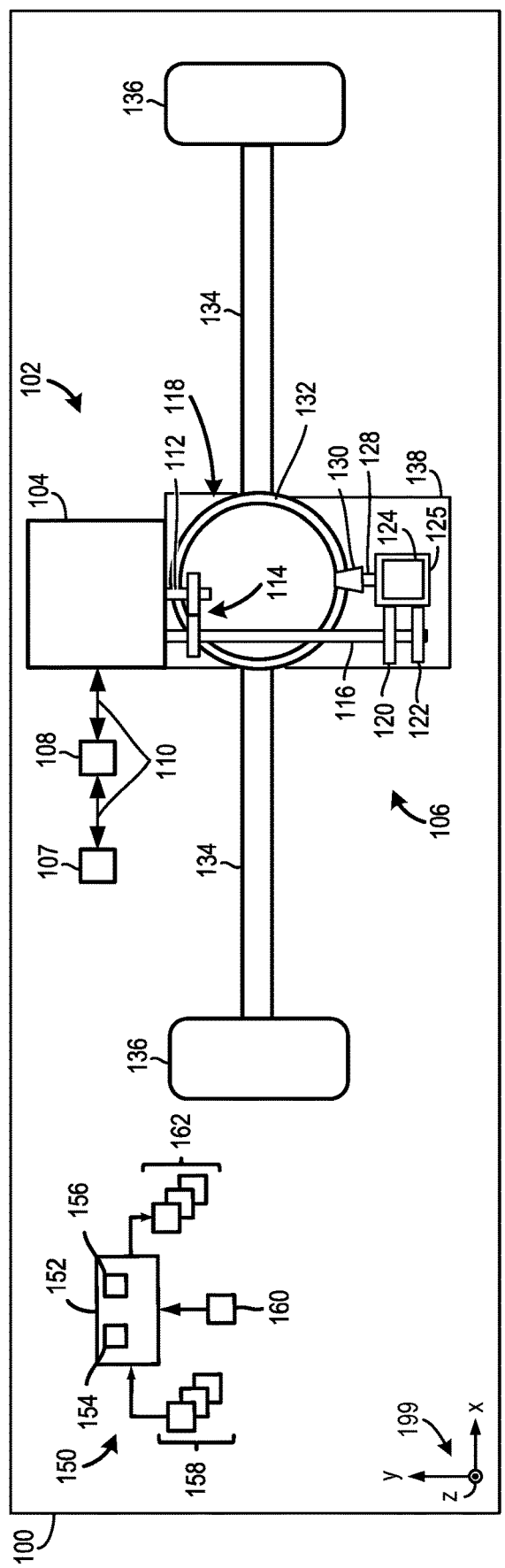
FIG. 1 is schematic depiction of an electric vehicle (EV) with an electric axle.

FIG. 1 depicts a vehicle 100. In the illustrated example, the vehicle 100 is an electric vehicle (EV). However, the vehicle 100 may be an internal combustion engine (ICE) vehicle in other examples. In the EV example, the vehicle includes an electric axle 102 that generates motive power for vehicle propulsion and includes a multi-speed gearbox assembly 106. Further, the vehicle may be a light, medium, or heavy duty vehicle. Specifically, in one example, the vehicle may be a heavy duty vehicle that is defined as a vehicle having a gross vehicle weight rating that is greater than approximately 6,350 kilograms (kg). However, in other examples, the vehicle may be a passenger vehicle such as a truck, sedan, wagon, and the like. Still further, in other examples, the vehicle may be a recreational vehicle. Further still, the vehicle may be a battery electric vehicle (BEV), in one example, or a hybrid electric vehicle (HEV) that includes an internal combustion engine, in another example. For instance, in the HEV example, the vehicle may include another axle that is driven by an internal combustion engine or the internal combustion engine may function to recharge the traction battery. Still further in other examples, the vehicle 100 may be a watercraft or a plane. Even further in alternate examples, the multi-speed gearbox assembly 106 and specifically the clutch cartridge that is included therein may be used in machinery such as industrial equipment.

The electric axle 102 includes an electric machine 104 that is rotationally coupled to a multi-speed gearbox assembly 106. The electric machine 104 may include components such as a rotor and a stator that electromagnetically interact during operation to generate motive power. Further in one example, the electric machine 104 may be a motor-generator which are designed to generate electrical energy during regeneration operation.

The electric machine 104 may be electrically coupled to one or more energy storage device(s) 107 (e.g., one or more traction batteries, capacitor(s), combinations thereof, and the like) by way of an inverter 108 when the machine is designed as alternating current (AC) machines. Arrows 110 denote the electrical connection between the electric machine 104, the inverter 108, and the energy storage device(s) 107. The inverter is designed to convert direct current (DC) to AC and vice versa. In one use-case example, the electric machine 104 and the inverter 108 may be multi-phase devices (e.g., three, six, or nine phase devices) which can achieve greater efficiency when compared to other types of motors.

The multi-speed gearbox assembly 106 may include a shaft 112 coupled to a rotor shaft of the electric machine 104. A pair of gears 114 may rotationally couple the shaft 112 to a shaft 116. More than two gears (e.g., multiple gear passes) may be used to couple the shafts 112 and 116 if a higher speed motor is used in the system, in other examples. The shaft 116 may extend across a differential 118. A gear 120 and a gear 122 may be coupled to the shaft 116 on the opposing side of the differential as the electric machine 104. However, alternate shaft and gear layouts of the multi-speed gearbox assembly have been contemplated.

The gears 120 and 122 may be rotationally coupled directly or indirectly through intermediate shafts to gears in a clutch cartridge 124 that is included in a pinion assembly 125. The pinion assembly 125 may additionally include the pinion shaft 128 which is coupled to the clutch cartridge 124 and/or other components. The gear 120 may directly mesh with a first gear in the clutch cartridge 124 and the gear 122 may mesh with a second gear in the clutch cartridge 124. The clutch cartridge 124 and the pinion assembly 125 are schematically depicted in FIG. 1. However, it will be appreciated that the clutch cartridge 124 and the pinion assembly 125 and associated components such as a pinion shaft 128, have greater structural complexity that is elaborated upon herein with regard to FIGS. 2-6 and 8.

The pinion shaft 128 is rotationally coupled to a tube shaft in the clutch cartridge 124. In turn, the pinion shaft 128 includes a pinion gear 130 positioned thereto. The pinion gear 130 meshes with a gear 132 (e.g., a ring gear) in the differential 118.

The differential 118 is rotationally coupled to axle shafts 134 that are in turn designed to rotationally couple to drive wheels 136. The differential 118 may be an open differential, a limited slip differential, or a locking differential, for instance. The electric axle 102 may include a housing 138 that encloses the pinion assembly 125 and the differential 118.

The vehicle 100 further includes a control system 150 with a controller 152 as shown in FIG. 1. The controller 152 may include a microcomputer with components such as a processor 154 (e.g., a microprocessor unit), input/output ports, an electronic storage medium 156 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 152 may receive various signals from sensors 158 coupled to various regions of the vehicle 100 and specifically the electric axle 102. For example, the sensors 158 may include a pedal position sensor designed to detect a depression of an operator-actuated pedal such as an accelerator pedal and/or a brake pedal, speed sensors at the input and/or outputs of the gearbox, energy storage device state of charge (SOC) sensor, clutch position sensors, and the like. Motor speed may be ascertained from the amount of power sent from the inverter to the electric machine. An input device 160 (e.g., accelerator pedal, brake pedal, drive mode selector, combinations thereof, and the like) may further provide input signals indicative of an operator's intent for vehicle control.

Upon receiving the signals from the various sensors 158 of FIG. 1, the controller 152 processes the received signals, and employs various actuators 162 of vehicle components to adjust the components based on the received signals and instructions stored on the memory of controller 152. For example, the controller 152 may receive an accelerator pedal signal indicative of an operator's request for increased vehicle acceleration. In response, the controller 152 may command operation of the inverter 108 to adjust electric machine power output and increase the power delivered from the electric machine 104 to the gearbox. The controller 152 may, during certain operating conditions, be designed to send commands to a clutch in the clutch cartridge 124, to engage and disengage the clutch. The other controllable components in the vehicle may function in a similar manner with regard to sensor signals, control commands, and actuator adjustment, for example.

An axis system 199 is provided in FIG. 1 as well as FIGS. 2-6 and 8, for reference. The z-axis may be a vertical axis (e.g., parallel to a gravitational axis), the x-axis may be a lateral axis (e.g., horizontal axis), and/or the y-axis may be a longitudinal axis, in one example.

Figure 2:
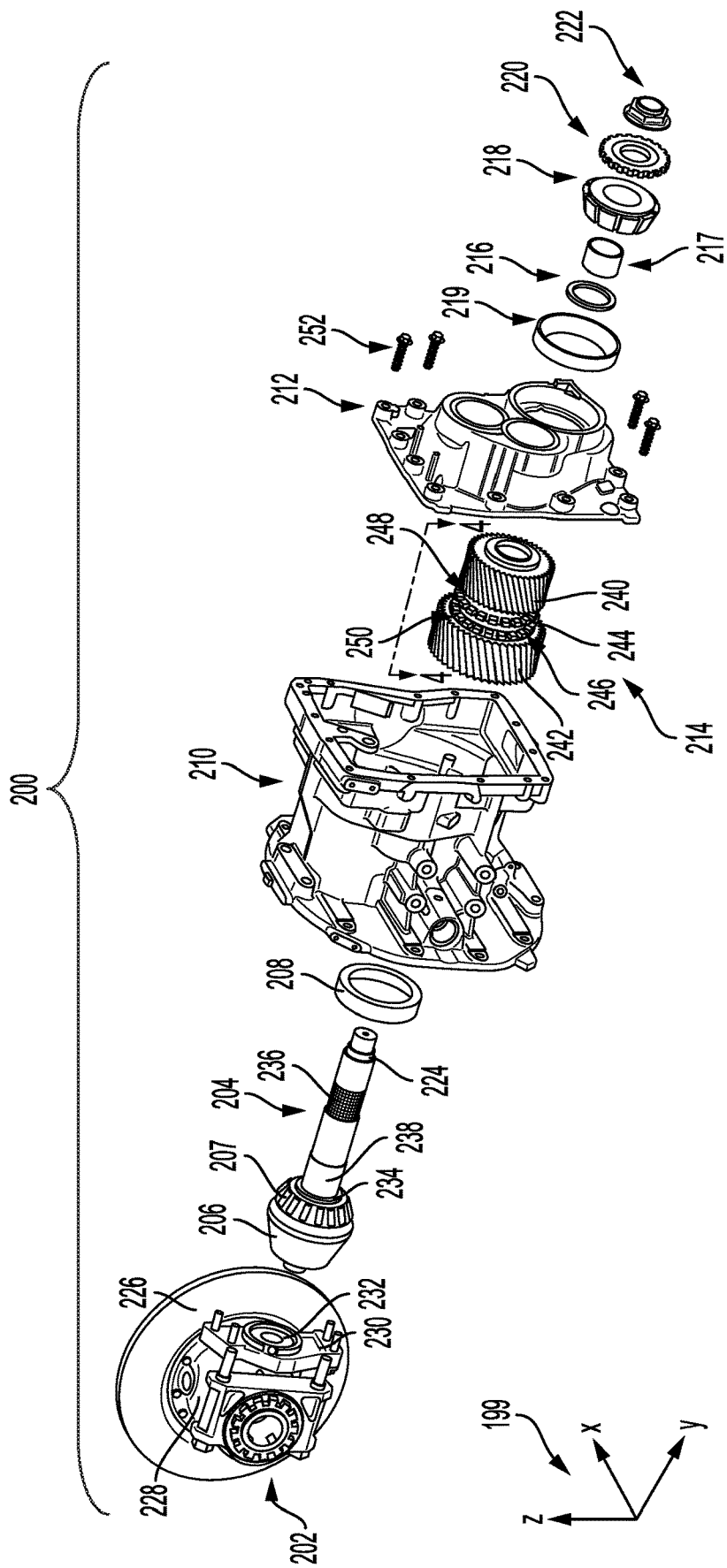
FIG. 2 is an exploded view of a portion of the multi-speed gearbox assembly.

FIG. 2 shows an exploded view of an example of a clutch cartridge 214 in a multi-speed gearbox assembly 200 which may be included in an electric axle or other suitable system. The multi-speed gearbox assembly 200 is an example of an assembly in the multi-speed gearbox assembly 106 shown in FIG. 1. Therefore, the components of the multi-speed gearbox assembly 200 shown in FIG. 2 may be included in the electric axle 102 shown in FIG. 1 and vice versa. Further, a clutch cartridge 214 shown in FIG. 2 serves as a detailed example of the clutch cartridge 124, shown in FIG. 1.

In the illustrated example, the multi-speed gearbox assembly 200 includes a differential 202, a pinion shaft 204 with a pinion gear 206 and a bearing 207 coupled thereto with an outer race 208 (e.g., bearing cup), housing sections 210 and 212, the clutch cartridge 214, a spacer 216, a sleeve 217, a bearing 218 with an outer race 219 (e.g., bearing cup), a tone wheel 220, and a nut 222 profiled to thread onto a threaded end 224 of the pinion shaft 204 when installed. The width of the spacer 216 may vary with the component's tolerance stack up needed to set the bearing preload.

The differential 202 includes a gear 226 (e.g., a ring gear) that is fixedly coupled to a case 228. It will be appreciated that the gear 226 and the pinion gear 206 have teeth in practice. In the illustrated example, the gear 226 and the pinion gear 206 are a hypoid gear set. Alternatively, the gear 226 and the pinion gear 206 may be formed as spiral bevel gears, other right angle gear sets, or a helical gear set with the gear 226 and the pinion gear 206 on parallel shafts. The differential 202 may further include a pinion shaft mounting structure 230 which allows the pinion shaft to be supported at one end via a bearing 232. The differential 202 may be an open differential, a locking differential, a torque vectoring differential, and the like. As such, the differential 202 may include internal gearing such as spider gears, side gears, and the like, in one example.

The pinion gear 206 on the pinion shaft 204 may be integral, press-fit, splined, and/or welded to the pinion shaft 204, for example. Further, the bearing 207 (e.g., tapered roller bearing) includes an end race 234 coupled to (e.g., press-fit) the pinion shaft 204. In the illustrated example, the pinion shaft 204 includes a splined section 236 and a locational fit section 238 (e.g., locational clearance fit section) each designed to attach to a tube shaft in the clutch cartridge 214, discussed in greater detail herein with regard to FIGS. 4-5.

The clutch cartridge 214 includes a first gear 240 and a second gear 242. The first gear 240 is smaller than the second gear 242 in the illustrated example. However, the cartridge may have other gear sizing, in alternate examples. The clutch cartridge 214 further includes a clutch ring 244 in a dog clutch 246. The clutch ring 244 includes a first toothed interface 248 and a second toothed interface 250. The clutch ring 244 is designed to axial slide along the clutch cartridge to selectively engage the first toothed interface 248 with a toothed interface 300, shown in FIG. 3 in the first gear 240 and engage the second toothed interface 250 with a toothed interface 302, shown in FIG. 3, in the second gear 242. The clutch ring 244 may therefore have a neutral position where the ring is disengaged from the first and second gears, an engaged positioned with the first gear 240, and an engaged positioned with the second gear 242. In this way, the clutch ring 244 may shift the gear cartridge between operating gears.

Figure 4:
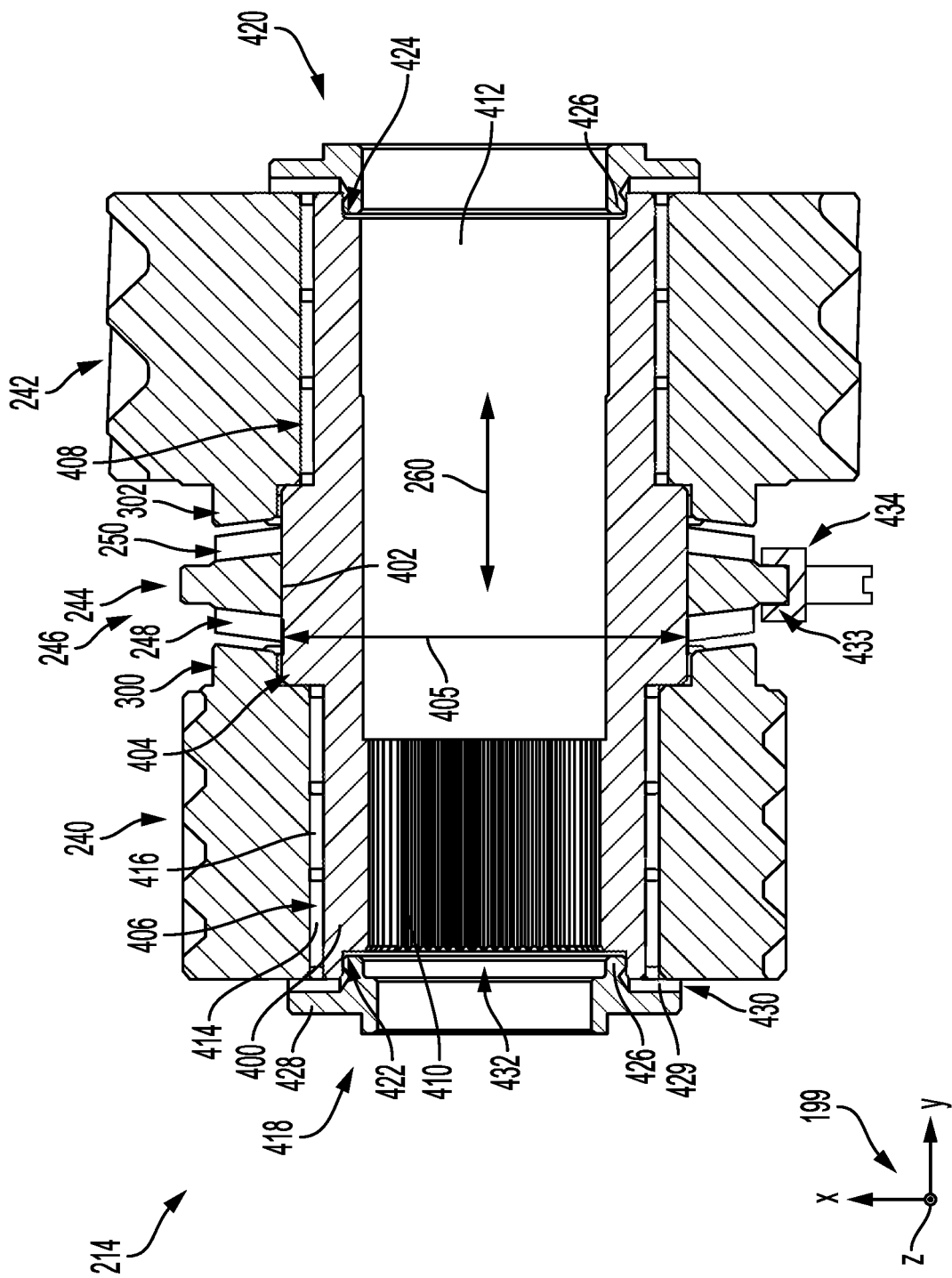
FIG. 4 is a cross-sectional view of a clutch cartridge included in the multi-speed gearbox assembly, depicted in FIG. 2.

When assembled, the housing sections 210 and 212 are coupled to one another via attachment devices 252 (e.g., screws, bolts, and the like). However, other suitable housing designs have been contemplated. Cut-plane 4-4 (which is parallel to the y-z plane) depicting the location of the cross-sectional view in FIG. 4 is indicated in FIG. 2.

Figure 3:
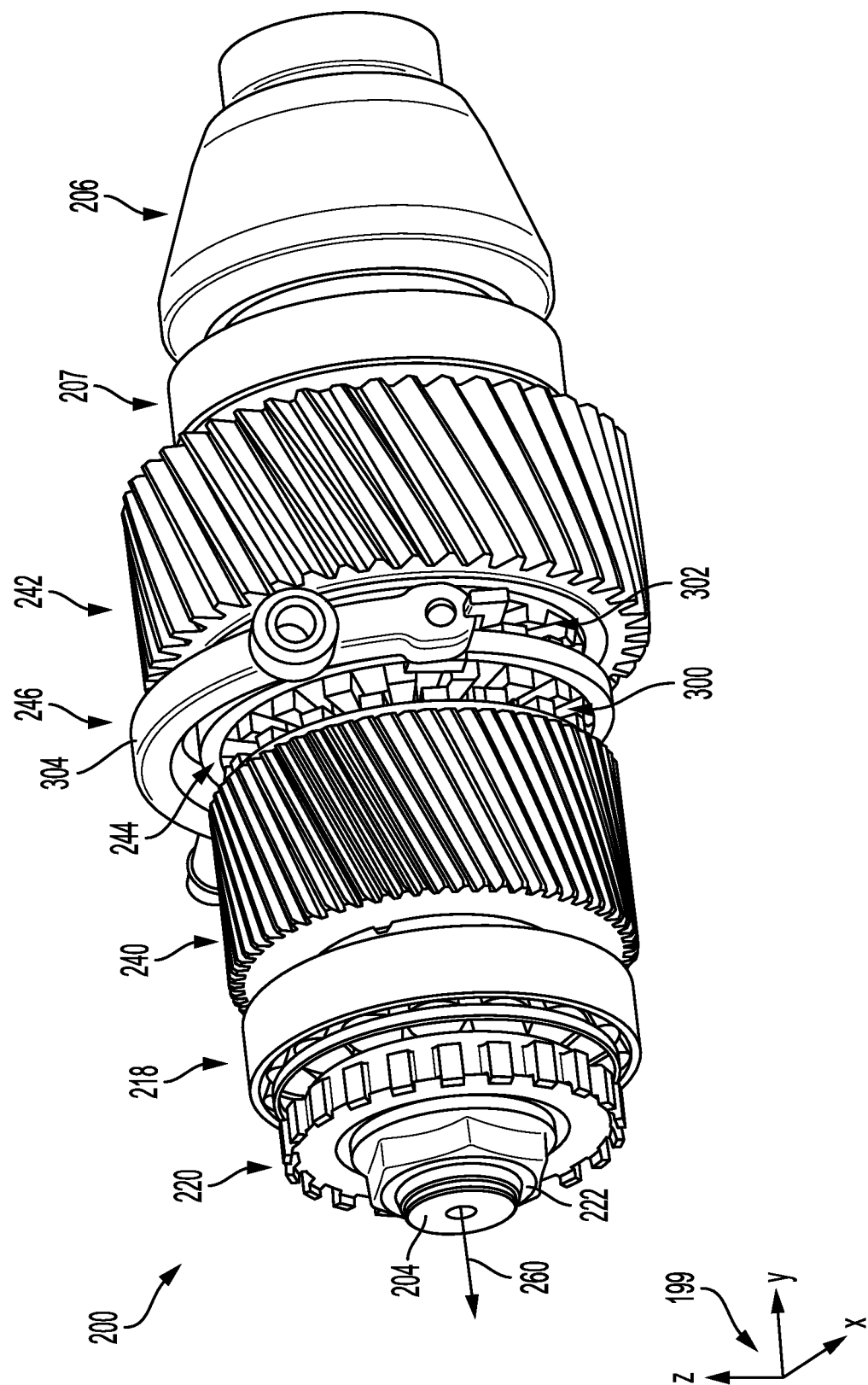
FIG. 3 is an assembled view of a portion of the multi-speed gearbox assembly, depicted in FIG. 2.

FIG. 3 shows the clutch cartridge 214 assembled on the pinion shaft 204. The clutch cartridge 214 is shown positioned between the bearing 207 (e.g., tapered roller bearing) and the bearing 218 (e.g., tapered roller bearing). The nut 222 threaded onto the pinion shaft 204 is further depicted in FIG. 3 along with the tone wheel 220 and the pinion gear 206.

FIG. 3 further shows a shift fork 304 designed to actuate the clutch ring 244 in the dog clutch 246. However, other suitable clutch, shift fork and actuation mechanisms have been contemplated. In the illustrated example, the clutch 246 is a curvic clutch. Alternatively, the clutch 246 may be a synchronizer with a ring that allows the speeds of the shaft and the gear to be synchronized during clutch engagement. Still further in other examples, the clutch 246 may be a wet or dry friction clutch. The friction clutches may include sets of plates that frictionally engage and disengage one another, during clutch engagement and disengagement. In the illustrated example, the shift fork 304 is rotational in nature but provides linear travel of the clutch ring 244. Alternatively, a purely linear shift fork may be used. Shift fork actuators may include mechanical, electro-mechanical, pneumatic, hydraulic, cam, and/or magnetic devices in one example.

The first gear 240 and the second gear 242 are again illustrated in FIG. 3. To elaborate, the first and second gears are illustrated as helical gears. However, other types of gears may be used in other embodiments, such as straight cut gears for example. More generally, a gear as described herein includes teeth that are designed to mesh with teeth in another gear to enable mechanical power to be transferred between the gears. Further, the pinion gear 206 is depicted with its teeth omitted. However, it will be understood that the gear has teeth in practice.

Tightening of the nut 222 allows preload in the clutch cartridge to be precisely and efficiently adjusted. This bearing preload is expanded upon herein with regard to the description of FIG. 5.

FIG. 4 shows a cross-sectional view of the clutch cartridge 214. The first gear 240, the second gear 242, a tube shaft 400, and the clutch ring 244 of the dog clutch 246 are again illustrated. The clutch ring 244 is slidingly engaged with the tube shaft 400. To elaborate, an inner circumference 402 of the clutch ring 244 may have a splined interface that mates with a spline on an outer circumference of the tube shaft 400. The spline on the tube shaft 400 may be included in a section 404 of the shaft with an outer diameter 405. The outer diameter 405 of the tube shaft section 404 may be greater than the diameters of the sections of the shaft that have bearings 406 and bearings 408 residing thereon. These bearings are described in greater detail herein.

The clutch ring 244 includes the first toothed interface 248 and the second toothed interface 250, as previously indicated. These toothed interfaces are positioned on opposing axial sides of the clutch ring 244. These toothed interfaces in the clutch ring are profiled to mate with toothed interfaces 300 and 302 in the first gear 240 and the second gear 242, respectively. The toothed interfaces in theses gears may be referred to as gear toothed interfaces. In the illustrated example, the toothed interfaces are positioned on axial sides of the gears adjacent to the clutch ring 244. In the clutch cartridge arrangement that makes use of the clutch ring 244, the clutch ring includes a ring 433 around its circumference. Further, in the clutch ring embodiment, a guide shoe 434 is slidingly engaged with the ring 433 and applies an axial force to the ring 433 to move the clutch ring 244 axially along the inner circumference 402. As shown the ring 433 is outward protruding and the guide shoe 434 is inward protruding. The outward protruding ring 433 may reduce the axial length and weight of the clutch cartridge 214. In other embodiments, an inward protruding ring 433 and an outward protruding guide shoe 434 have been considered. Further, the guide shoe 434 may be coupled to the shift fork 304.

The tube shaft 400 includes a splined section 410 and a locational fit section 412 (e.g., a locational clearance fit section). The splined section 410 and the locational fit section 412 are profiled to couple to a splined section 236 and the locational fit section 238 of the pinion shaft 204, shown in FIG. 2. In this way, the clutch cartridge 214 and specifically the tube shaft 400 and the pinion shaft 204 contain mating geometries (e.g., splines and pilot diameter) that allow for radial misalignment to be reduced (e.g., minimized) and the torsional forces to be transmitted between these shafts. The increased radial thickness of the tube shaft 400 in conjunction with the splined sections 410 and 236 and locational fit sections 412 and 238 of the tube shaft reduces the radial deflection (e.g., maximum radial deflection) and stress (e.g., bending stresses) in the pinion shaft 204, thereby resulting in a strengthened pinion assembly when the pinion assembly includes the clutch cartridge and the pinion shaft. To elaborate, the clutch cartridge may reduce the stress and deflection of the pinion shaft during operation. As a result, pinion shaft longevity is increased. A rotational axis 260 (which is parallel to the y-axis) of the multi-speed gearbox assembly 200 is provided in FIGS. 3, 4-6, and 8 for reference.

FIG. 4 further depicts the bearings 406 and the bearings 408 that are coupled to the first gear 240 and the second gear 242, respectively as well as the tube shaft 400. In this way, the first and second gears 240, 242 are allowed to rotate on the shaft. The bearings 406 and 408 may specifically be needle bearings, in example. In the needle bearing example, the bearings include rollers 414 and raceways 416. The use of needle roller bearings allows the clutch cartridge's compactness to be increased in comparison to other types of bearings such as ball, cylindrical roller, or tapered bearings.

A first end cap 418 and a second end cap 420 may be coupled to the tube shaft 400 on opposing axial sides thereof. The end caps 418, 420 may each be coupled to (e.g., press-fit, mechanically attached, threaded, welded, combinations thereof) the tube shaft 400. The tube shaft 400 is specifically illustrated including recesses 422, 424 sized to receive axial flanges 426 in the end caps 418, 420. In other embodiments, end caps 418 and 420 coupling external to tube shaft 400 have been considered. The end caps further include radial extending sections 428 which constrain the axial travel of the bearings 406, 408 and gears 240, 242. Further the end caps may even further include radially extending relief sections 429 to allow for lubrication. Axial clearances 430 may be formed between the end caps and the bearings 406, 408 and gears 240, 242 to enable the gears to rotate without frictional interference.

The splined section 410 in the tube shaft 400 may be positioned on one axial side 432 of the shaft to facilitate efficient manufacturing of the spline, torque capacity, alignment and subsequent installation of clutch cartridge on the pinion shaft.

Figure 5:
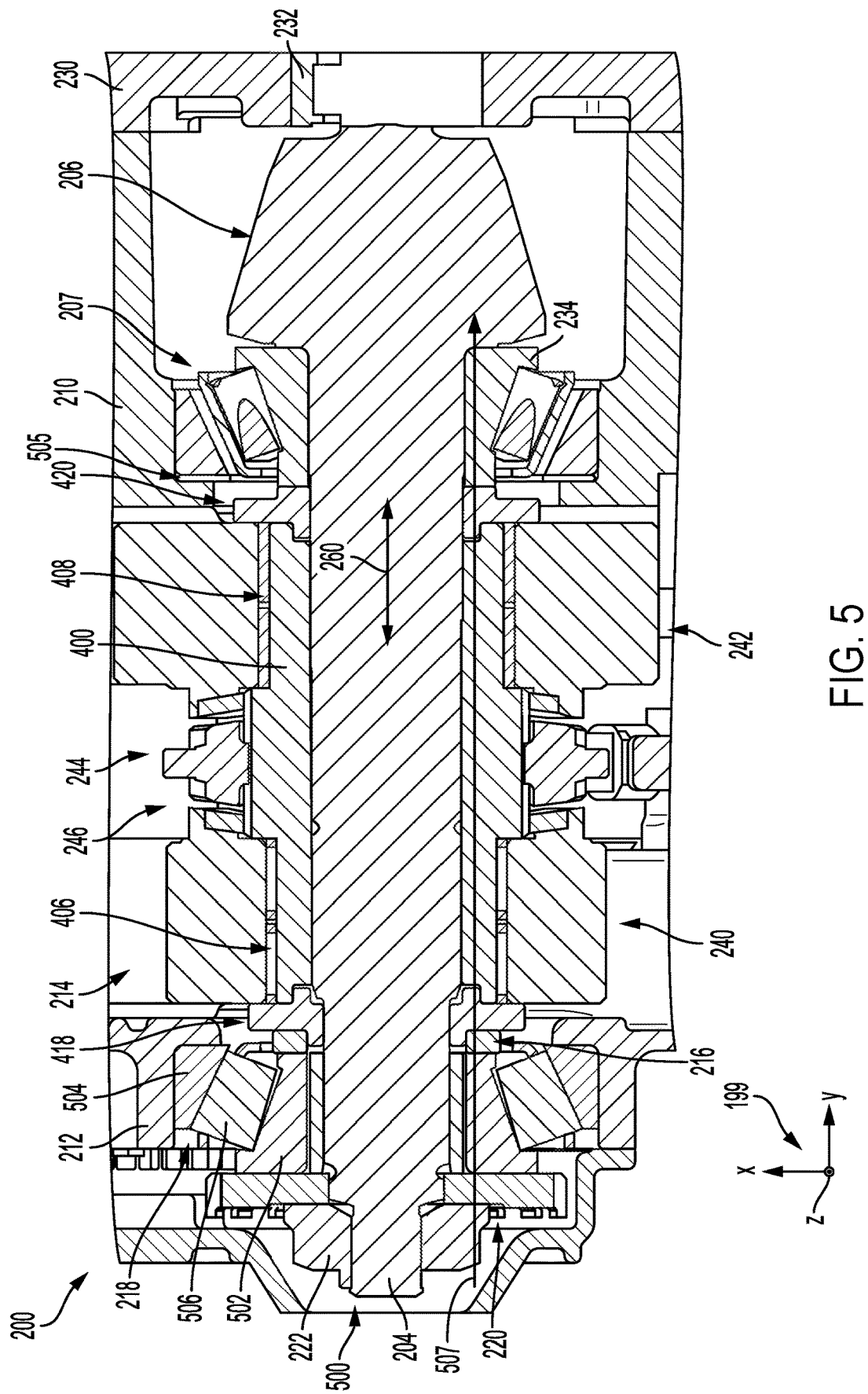
FIG. 5 is a cross-sectional view of a portion of the multi-speed gearbox assembly, depicted in FIG. 2.

FIG. 5 shows a cross-sectional view of the multi-speed gearbox assembly 200. The clutch cartridge 214 which includes the tube shaft 400, the bearing 207, the bearing 218, the first gear 240, the second gear 242, the end caps 418 and 420, and the clutch ring 244 of the dog clutch 246 is again shown. Further, the clutch cartridge 214 is shown mounted on the pinion shaft 204. The bearings 406 and 408 (e.g., needle roller bearings) and the pinion gear 206 coupled to the pinion shaft 204 are further illustrated in FIG. 5.

The inner races 502, outer races 504, and roller elements 506 (e.g., tapered rollers) of the bearings 207 and 218 are further illustrated in FIG. 5. The bearings 207 and 218 and specifically the outer races 504 may be mated in sections of the housing sections 210 and 212. Further, the bearing 232 in the pinion shaft mounting structure 230 that is coupled to the end of the pinion shaft 204 is further shown.

The nut 222 which is threaded onto the pinion shaft 204 at an axial end 500 opposite the pinion gear is further depicted. Tightening the nut 222 clamps the tone wheel 220, inner race 502 of bearing 218, spacer 216, first end cap 418, tube shaft 400, second end cap 420, and the end race 234 of the bearing 207 between the nut 222 and the pinion gear 206. Pinion gear 206 axial position is provided by the thickness of shim 505. Preload of bearings 218 and 207 may be accomplished through the thickness of spacer 216, first end cap 418, tube shaft 400, second end cap 420, housings 210 and 212. The resulting clamping force is indicated at 507 in FIG. 5. In this way, the bearing preload passes through the clutch cartridge 214, the clutch cartridge 214 is rigidly clamped, and the first gear 240 and second gear 242 rotate freely when clutch ring 244 is in a neutral position.

Figure 8:
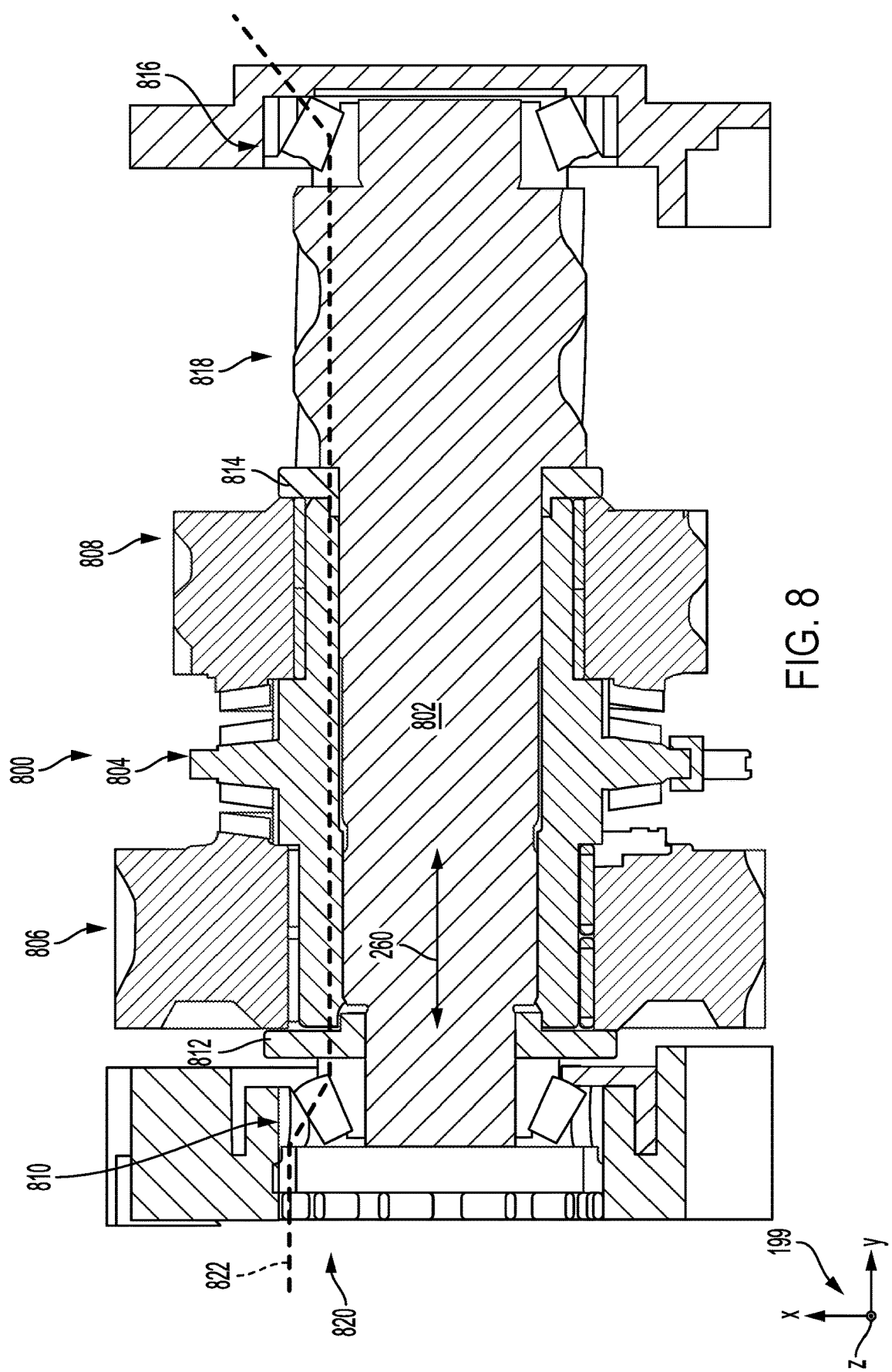
FIG. 8 shows another example of a clutch cartridge and pinion shaft assembly.

FIG. 8 shows another example configuration of a clutch cartridge 800 on a pinion shaft 802. The clutch cartridge 800 may have interior splines and/or locational fits (e.g., locational clearance fits or press fits) with the pinion shaft 802. The clutch cartridge 800 again includes a dog clutch 804, gear 806, and gear 808. A bearing 810 (e.g., tapered bearing), end caps 812 and 814, and a bearing 816 (e.g., tapered bearing) in the pinion shaft assembly are illustrated along with a gear 818 which is formed on or otherwise coupled to the pinion shaft 802.

A preload ring 820 is included in the pinion shaft assembly as opposed to the nut in the pinion shaft assembly depicted in FIG. 5. The preload ring 820 preloads the tapered bearings and the preload reaction and clamp passes through the clutch cartridge 800. The bearing preload and the clamp path is indicated at 822. Further, a spacer near the bearing 810 and a shim near the end cap 814 may be omitted from the pinion shaft assembly to simplify assembly.

Figure 6:
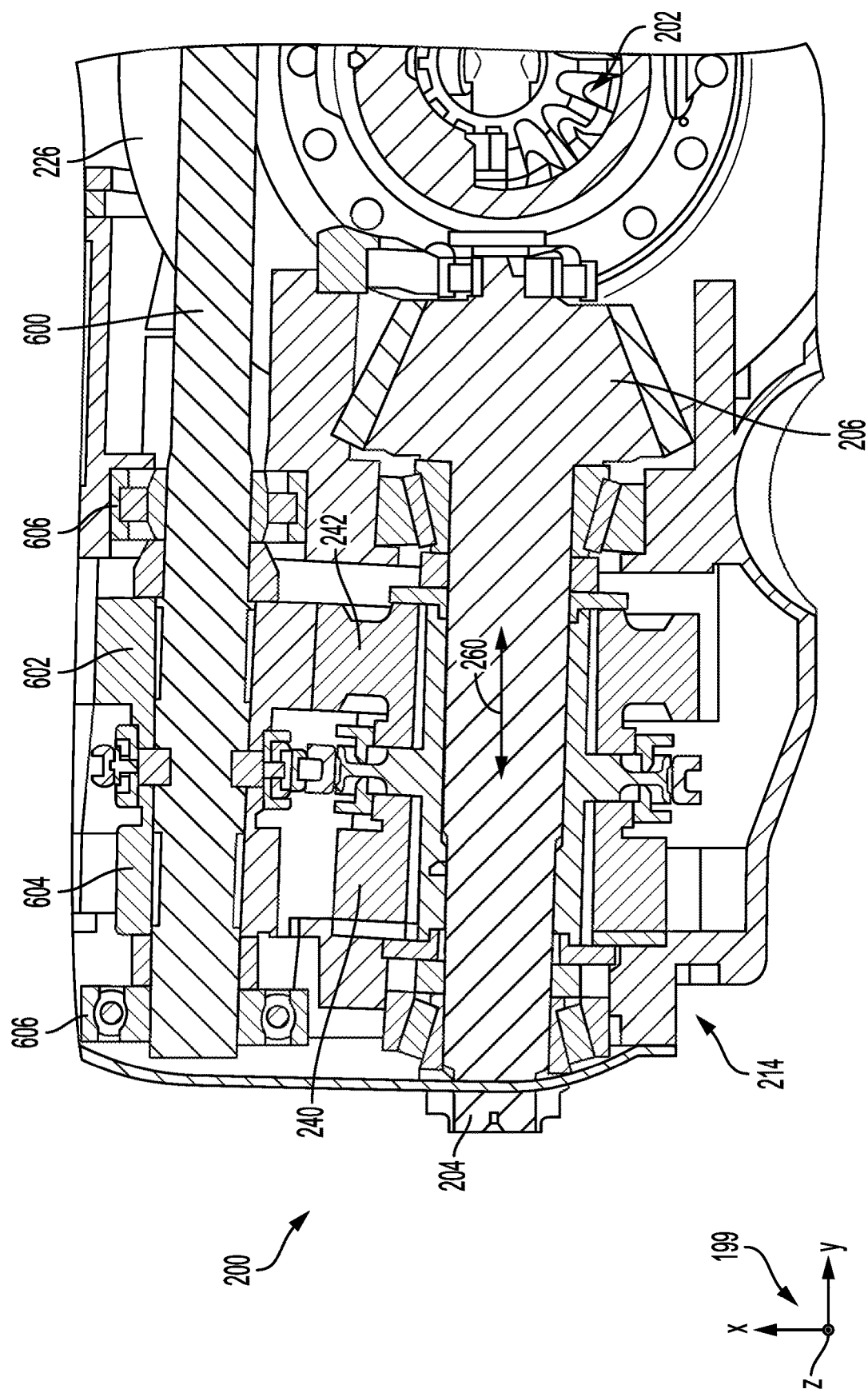
FIG. 6 is another cross-sectional view of the multi-speed gearbox assembly.

FIG. 6 shows the multi-speed gearbox assembly 200. A shaft 600 with a gear 602 and a gear 604 residing thereon is depicted. The gear 602 may be rotationally coupled to the second gear 242 and the gear 604 may be rotationally coupled to the first gear 240, in one example. This rotational coupling may be direct or indirect via gears on a layshaft. In this way, the clutch cartridge 214 is coupled to upstream components in the system. Bearings 606 may be coupled to the shaft 600. These bearings support and permit rotation of the shaft 600 are further illustrated in FIG. 6.

The gear 226 (e.g., ring gear) in the differential 202 that meshes with the pinion gear 206 is further shown in FIG. 6. In this way, the pinion is able to transfer mechanical power to downstream components.

Figure 7A:
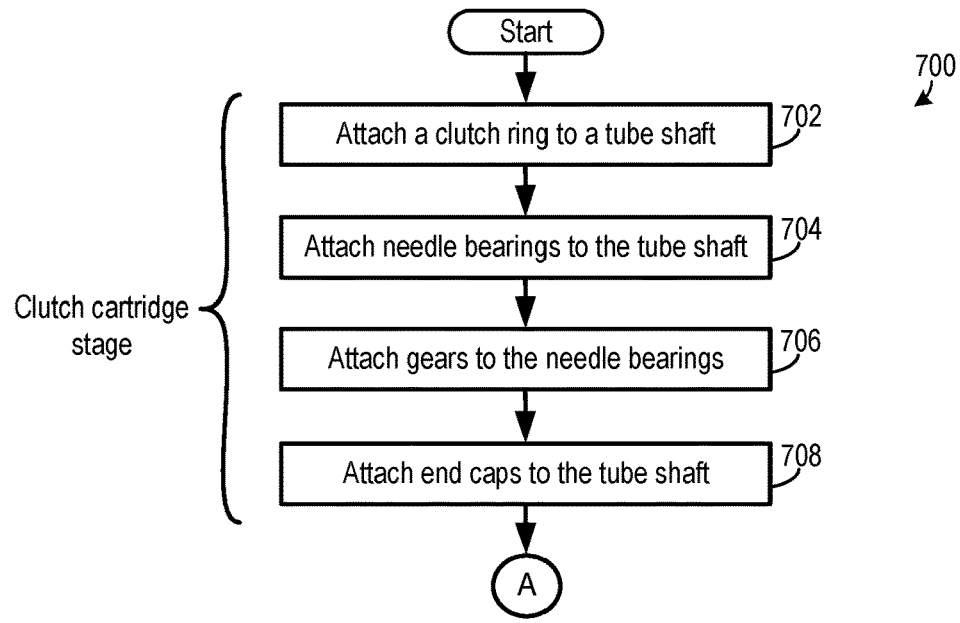
FIGS. 7A-7B is a method for manufacturing a multi-speed gearbox assembly.
Figure 7B:
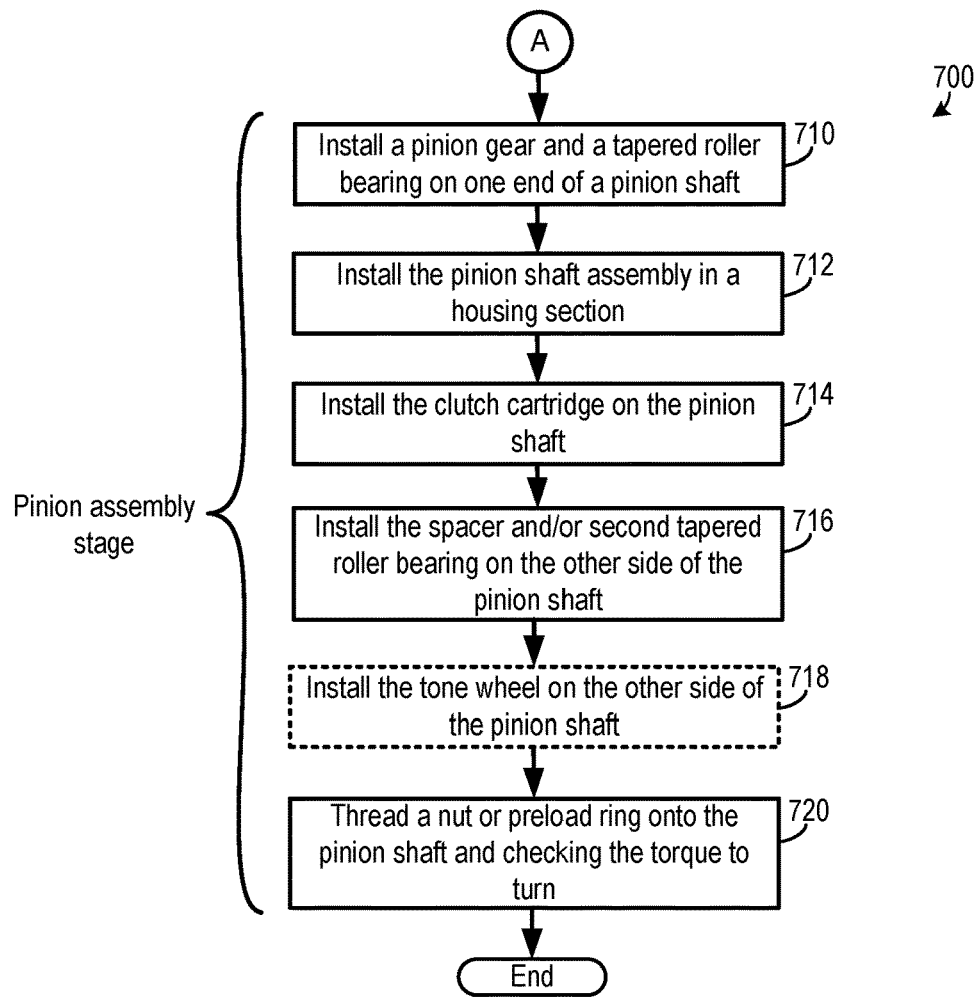

FIGS. 7A and 7B show a method 700 for assembling a multi-speed gearbox assembly. The method is partitioned into stages that may be implemented at different times and/or in different locations, thereby increasing the adaptability of the manufacturing method. The method 700 may be used to assemble the multi-speed gearbox assembly and specifically the clutch cartridge depicted in FIG. 2-6 or 8, in one example. However, in other examples, the method 700 may be used to manufacture other suitable multi-speed gearbox assemblies. The method 700 may be implemented by one or more machines such as machines configured for press-fitting, cranes, hoists, torque wrenches, torque to turn recording devices, and the like. The machines may include instructions stored in memory executable by a processor to implement the different steps. To elaborate, at least some of the method steps may be implemented as automated machine processes. However, in other examples, at least some of the steps may be implemented in response to user input or may be manually implemented via assembly personnel.

At 702, the method includes attaching the clutch ring to the tube shaft. For instance, the splines in each of the clutch ring and the tube shaft may be mated to form the attachment at step 702.

Next at 704, the method includes attaching needle bearings to the tube shaft. For instance, the raceways of the bearings may be attached to sections of the tube shaft axially outboard of the section of the shaft to which the clutch ring is attached. For instance, the raceways may be machined into the tube shaft due to the cross-sectional tube shaft thickness. However, in other examples, the needle bearing raceways may be press fit onto the tube shaft.

At 706, the method includes attaching the gears to the needle bearings. For example, the inner circumference of the gears may slide into contact with the needle bearing rollers. Next at 708, the method includes attaching end caps to the tube shaft. For instance, the end caps may be mated with recesses in the ends of the tube shaft.

Steps 702-708 signify the clutch cartridge assembly stage that may be implemented on a bench or other suitable location. This stage may be efficiently carried out and allows the manufacturing flexibility of the gearbox to be increased.

FIG. 7B shows a pinion assembly stage of the method 700. At 710, the method includes installing a pinion gear and a tapered roller bearing on one end of a pinion shaft. The pinion gear may be machined on the pinion shaft, in one example. However, other pinion gear and pinion shaft manufacturing techniques may be used, in other examples.

At 712, the method includes installing the pinion shaft assembly in a housing section. Next at 714, the method includes installing the clutch cartridge on the pinion shaft. For instance, splines in the clutch cartridge and the pinion shaft may be aligned and then mated with one another. Further, the clutch cartridge may be press fit onto the pinion shaft. In an alternate example, such as when assembling the clutch cartridge depicted in FIG. 8, steps 714-718 may be implemented prior to step 712.

At 716, the method includes installing the spacer and/or the second tapered roller bearing on the other side of the pinion shaft. Next at 718, the method includes installing the tone wheel on the other side of the pinion shaft. However, in other examples, step 718 may be omitted from the method and the tone wheel may therefore be omitted from the assembly. Next at 720, the method includes threading the nut or a preload ring onto the pinion shaft and checking the torque to turn. In this way, the tapered roller bearings can be efficiently preloaded, and reduce the chance of undesirable noise, vibration, and harshness (NVH) in the system.

FIGS. 2-6 and 8 are drawn approximately to scale, aside from the schematically depicted components. However, the multi-speed gearbox assembly may have other relative components dimensions in alternate embodiments.

FIGS. 1-6 and 8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a clutch cartridge is provided that comprises a dog clutch including: a clutch ring slidingly engaged with a tube shaft and including a first toothed interface and a second toothed interface; wherein the dog clutch is designed to: selectively engage the first toothed interface with a first gear toothed interface on a first gear, and selectively engage the second toothed interface with a second gear toothed interface on a second gear; a first bearing coupled to the tube shaft and the first gear; and a second bearing coupled to the tube shaft and the second gear.

In another aspect, a method for assembling a multi-speed gearbox assembly is provided that comprises attaching a first gear, a second gear, a clutch ring of a dog clutch to a tube shaft to form a clutch cartridge; and coupling the clutch cartridge to a pinion shaft; wherein attaching the first gear and the second gear to the tube shaft includes attaching a first bearing and a second bearing to the tube shaft and attaching the first and second gears to the first bearing and the second bearing. The method may further include, in one example, applying a preload to tapered bearings coupled to the pinion shaft via tightening of a nut on a threaded portion of the pinion shaft, or via tightening a preload ring in the housing.

In yet another aspect, a multi-speed gearbox assembly is provided that comprises a clutch cartridge, comprising: a dog clutch including a clutch ring slidingly engaged with a tube shaft; wherein the dog clutch is designed to selectively engage a first gear and a second gear; and a first bearing coupled to the tube shaft and the first gear; and a second bearing coupled to the tube shaft and the second gear; wherein the dog clutch, the tube shaft, the first bearing, and the second bearing form a continuous structure.

In any of the aspects or combinations of the aspects, the tube shaft may include an interior splined section and an interior locational fit section each designed to couple to a pinion shaft.

In any of the aspects or combinations of the aspects, the interior splined section may be positioned at or adjacent to an axial end of the tube shaft and is adjacent to an end cap.

In any of the aspects or combinations of the aspects, the interior splined section may be positioned near a middle section of the tube shaft.

In any of the aspects or combinations of the aspects, the first bearing and the second bearing may be needle bearings.

In any of the aspects or combinations of the aspects, the clutch ring may be splined to the tube shaft.

In any of the aspects or combinations of the aspects, the clutch cartridge may further comprise a first end cap and a second end cap coupled to opposing ends of the tube shaft.

In any of the aspects or combinations of the aspects, axial clearances are formed between the first end cap and the first bearing and the second end cap and the second bearing.

In any of the aspects or combinations of the aspects, axial clearances are formed between the first end cap and the first gear and the second end cap and the second gear.

In any of the aspects or combinations of the aspects, the first toothed interface may be positioned on an axial side of the first gear and the second toothed interface is positioned on an axial side of the second gear.

In any of the aspects or combinations of the aspects, the clutch ring may be positioned axially between the first gear and the second gear.

In any of the aspects or combinations of the aspects, coupling the clutch cartridge to the pinion shaft may include engaging splines in an interior section of the tube shaft with splines on the pinion.

In any of the aspects or combinations of the aspects, coupling the clutch cartridge to the pinion shaft may include locational fitting a portion of the interior section of the tube shaft with a section of the pinion shaft and the tube shaft therefore includes an interior locational fit section.

In any of the aspects or combinations of the aspects, the pinion shaft may be positioned in a housing.

In any of the aspects or combinations of the aspects, the multi-speed gearbox assembly may further comprise a pinion shaft coupled to and extending through the tube shaft, wherein a pinion gear is positioned at a first end of the pinion shaft and meshes with a gear.

In any of the aspects or combinations of the aspects, the pinion shaft may include a nut threaded onto a second end of the pinion shaft; the nut when tightened may apply a preload to the clutch cartridge; and the clutch cartridge may be positioned axially between the first bearing and the second bearing.

In any of the aspects or combinations of the aspects, the clutch cartridge may be positioned axially between the first bearing and the second bearing; the pinion shaft may include a nut threaded onto a second end of the pinion shaft or a preload ring may be positioned in a housing; and the nut or preload ring when tightened applies a preload to the clutch cartridge.

In any of the aspects or combinations of the aspects, the multi-speed gearbox assembly may be included in a vehicle.

In any of the aspects or combinations of the aspects, the clutch cartridge may be designed to couple to a pinion shaft and increase the strength of the pinion shaft.

In another representation, an electric axle shifting cartridge is provided that includes a synchronizer ring in a clutch which slides on a tube shaft to engage a first gear in a first position and a second gear in a second axial position, wherein needle bearings are coupled to the first and second gears and the tube shaft to allow the first and second gears to independently rotate when they are not engaged by the synchronizer ring.

The manufacturing methods and routines disclosed herein may be stored as executable instructions in non-transitory memory and may be carried out by a manufacturing system including the controller in combination with the various sensors and actuators. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The technology may be used as a stand-alone, or used in combination with other power transmission systems not limited to machinery and propulsion systems for tandem axles, electric tag axles, P4 axles, HEVs, BEVs, agriculture, marine, motorcycle, recreational vehicles and on and off highway vehicles, as an example. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the term "approximately" is construed to mean plus or minus five percent of the range, unless otherwise specified.

The invention claimed is:

1. A clutch cartridge, comprising:
   a dog clutch including:
   a clutch ring with a splined interface at an inner diameter, wherein the splined interface of the clutch ring is directly slidingly engaged with an outer diameter of a tube shaft, wherein the clutch ring includes a first toothed interface and a second toothed interface, and wherein the first toothed interface and the second toothed interface are positioned on opposing axial sides of the clutch ring;
wherein the dog clutch is designed to:
selectively engage the first toothed interface with a first gear toothed interface on a first gear, and
selectively engage the second toothed interface with a second gear toothed interface on a second gear;
a first bearing coupled to the tube shaft and the first gear; and
a second bearing coupled to the tube shaft and the second gear;
wherein the first gear includes teeth on an outer circumference;
wherein the second gear includes teeth on an outer circumference; and
wherein the tube shaft includes an interior splined section and a locational clearance fit section at an inner diameter that are profiled to couple to a pinion shaft.

2. The clutch cartridge of claim 1, wherein:
the interior splined section is positioned radially inward from the first gear; and
the locational clearance fit section is positioned radially inward from the second gear.

3. The clutch cartridge of claim 1, wherein the pinion shaft includes a pinion gear at a first axial end and a second axial end configured to couple to a nut.

4. The clutch cartridge of claim 1, further comprising a third bearing coupled to the pinion shaft axially outboard from the first gear and a fourth bearing coupled to the pinion shaft axially outboard from the second gear.

5. The clutch cartridge of claim 4, further comprising a first end cap and a second end cap coupled to:
opposing ends of the tube shaft; and
the pinion shaft axially inboard from the third bearing and the fourth bearing, respectively.

6. The clutch cartridge of claim 5, wherein axial clearances are formed between the first end cap and the first gear and the second end cap and the second gear.

7. The clutch cartridge of claim 1, wherein the first toothed interface is positioned on an axial side of the first gear and the second toothed interface is positioned on an axial side of the second gear.

8. The clutch cartridge of claim 1, wherein the splined interface of the clutch ring is positioned radially inward from an inner diameter of the first gear.

9. The clutch cartridge of claim 8, wherein the clutch ring includes a ring around its circumference.

10. A multi-speed gearbox assembly, comprising:
a clutch cartridge, comprising:
a dog clutch including a clutch ring slidingly engaged with an outer diameter of a tube shaft via a splined interface;
wherein the dog clutch is designed to selectively engage a first gear and a second gear; and
a first bearing coupled to the tube shaft and the first gear; and
a second bearing coupled to the tube shaft and the second gear;
wherein the first gear includes teeth on an outer circumference;
wherein the second gear includes teeth on an outer circumference;
wherein the dog clutch, the tube shaft, the first bearing, and the second bearing form a continuous structure;
wherein the tube shaft includes an interior splined section and a locational clearance fit section that are positioned at an inner diameter and are profiled to couple to an outer diameter of a pinion shaft; and
wherein the clutch ring includes a first toothed interface and a second toothed interface which are positioned on opposing axial sides of the clutch ring.

11. The multi-speed gearbox assembly of claim 10, wherein:
the interior splined section is positioned radially inward from the first gear; and
the locational clearance fit section is positioned radially inward from the second gear.

12. The multi-speed gearbox assembly of claim 10, wherein the pinion shaft is coupled to and extends through the tube shaft and a pinion gear is positioned at a first end of the pinion shaft.

13. The multi-speed gearbox assembly of claim 12, wherein:
the clutch cartridge is positioned axially between a third bearing and a fourth bearing;
the third bearing is coupled to the pinion shaft axially outboard from the first gear and the fourth bearing is coupled to the pinion shaft axially outboard from the second gear;
the pinion shaft includes a nut threaded onto a second end of the pinion shaft or a preload ring is positioned in a housing; and
the nut or preload ring when tightened applies a preload to the clutch cartridge.

14. The multi-speed gearbox assembly of claim 10, wherein the multi-speed gearbox assembly is included in a vehicle.

15. A method for assembling a multi-speed gearbox assembly, comprising:
attaching a clutch ring of a dog clutch, a first gear, a second gear to an outer diameter of a tube shaft to form a clutch cartridge; and
coupling an inner diameter of the clutch cartridge to a pinion shaft;
wherein the first gear includes teeth on an outer circumference;
wherein the second gear includes teeth on an outer circumference;
wherein the clutch ring includes a splined interface at an inner diameter;
wherein the splined interface of the clutch ring is attached to the outer diameter of the tube shaft;
wherein the tube shaft includes an interior splined section and a locational clearance fit section at an inner diameter that are profiled to couple to the pinion shaft;
wherein attaching the first gear and the second gear to the tube shaft includes attaching a first bearing and a second bearing to the tube shaft and attaching the first and second gears to the first bearing and the second bearing; and
wherein the clutch ring includes a first toothed interface and a second toothed interface which are positioned on opposing axial sides of the clutch ring.

16. The method of claim 15, wherein the splined interface of the clutch ring is positioned radially inward from an inner diameter of the first gear.

17. The method of claim 16, wherein:
the locational clearance fit section is positioned radially inward from the second gear.

18. The method of claim 15, further comprising applying a preload to bearings coupled to the pinion shaft via tightening of a nut on a threaded portion of the pinion shaft or via tightening a preload ring in a housing.

19. The method of claim 15, wherein the pinion shaft is positioned in a housing.

\* \* \* \* \*